UNITED STATES PATENT OFFICE.

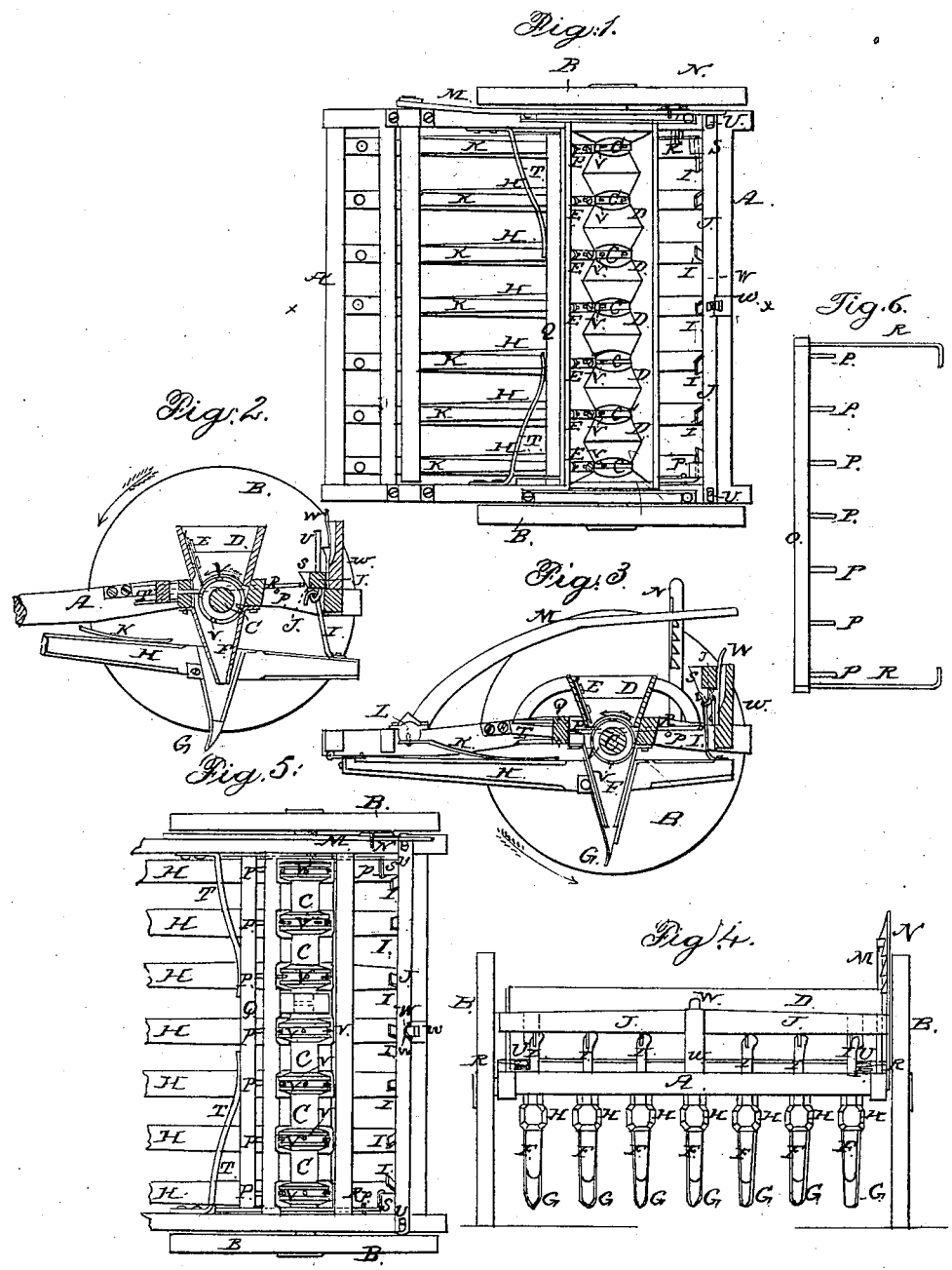

DAVID DIEHL, OF HANOVER, PENNSYLVANIA.

IMPROVEMENT IN SEED-PLANTERS.

Specification forming part of Letters Patent No. 6,516, dated June 12, 1849.

*To all whom it may concern:*

Be it known that I, DAVID DIEHL, of Hanover, in the county of York and State of Pennsylvania, have invented a new and useful Improvement in the Machine for Planting Seed and Grain called "Diehl's Improved Seeder," which is described as follows, reference being had to the annexed drawings of the same, making part of the specification.

Figure 1 is a bird's-eye view of the machine. Fig. 2 is a vertical longitudinal section on the line *x x* of Fig. 1, showing the cultivator-tooth let down for operation and the valve receded from the channel of the planting-cylinder. Fig. 3 is a vertical longitudinal section on the same line *x x* of Fig. 1, showing the tooth raised above the surface of the ground and the valve closed into the channel of the planting-cylinder. Fig. 4 is a top view of the rear portion of the machine, the hoppers being removed, showing the valves receded from circular channels of the planting-cylinders. Fig. 5 is a back elevation of the machine, showing the teeth raised and suspended above the ground by the horizontal transverse bar. Fig. 6 is a plan of the bar containing the valves.

Similar letters in the several figures refer to like parts.

The following-named parts are made and arranged and operated in the usual manner, namely: the frame A, the supporting and propelling wheels B B, the planting-cylinders C C, the hoppers D, the gage-slides E, the conducting-tubes F, the hollow cultivator-teeth G, the hinged beams H, the straps or chains I, that suspend them to the lifting-bar J.

My improvements relate to a combination and arrangement and operation of springs K, spring shaft or roller L, lever M, and rack N, for increasing or diminishing the pressure of the cultivator-teeth according to the hardness or mellowness of the soil, so as to make the furrowing of a proper depth; also, to a combination and arrangement and operation of a number of horizontal valves, P, that are made to enter the channels of the planting-cylinder, and a sliding bar, Q, into which they are inserted, and bent rods R, cams S, and springs T, for opening and closing the valves; likewise, to a series of radial notched pins, V, inserted into the peripheries of the planting-cylinders, in the channels therein, for the purpose of preventing the seed from lodging against the lower ends of the slides E and choking the channels to such degree as to prevent the seed leaving the hopper as the cylinders revolve.

The larger ends of the springs K are secured to the roller L by screws or other means. The smaller ends bear upon the beams H, to which the hollow cultivator-teeth are affixed. The gudgeons of the roller turn in suitable boxes affixed to the frame. The lever M, for turning the roller, is affixed to one of the gudgeons, which is extended beyond its box sufficiently far to receive it. The rack or notched plate N, for holding the lever in any desired position according to the force desired to be imparted to the spring, is fastened to the frame in any convenient place. The bar J moves up and down over suitable parallel guide-rods, U, inserted into the frame A. The spring-dog W, for holding up the bar J when raised, is fastened by its lower end to a post, *w*, inserted into the frame. The cams or wedges S are fastened to the bar J. The bent rods R, against which the cams or wedges act, are inserted into the sliding bar Q and pass horizontally through openings in the ends of the hopper. *p* are pins projecting from the frame to sustain the rods R while the cams S are acting.

The horizontal sliding pointed valves P, for opening or closing the channels of the planting-cylinders, are simple bars or rods inserted horizontally into a transverse bar of wood, Q, that is made to slide horizontally back and forth, as required, in grooves formed on the inner side pieces of the frame by rods or plates, into which grooves the ends of the bar are inserted by means of the cams S on the lifting-bar J and the springs T affixed to the frame.

The operation of these valves is as follows: When the farmer is about to commence furrowing and planting he draws up the slides E to the required height to allow the seed to be discharged from the channel. He then lays hold of the spring-catch W and draws it back from under the bar J. The bar J then descends and lets down the beams H and the hollow cultivator-teeth G, and while descending the cams S strike against the bent ends of the rods R and move them horizontally toward the forward end of the machine, carrying with them the bars Q and valves P and contracting the springs T. The valves P will be held in this position while seeding. When it is required to stop the planting the operator lays hold of the bar J and raises it, which raises the cultivator-teeth and liberates the cam S from the rods R. The springs T force back the bar Q, with the valves P, and close the channels of the planting-cylinders. The spring-catch W passes under the bar J and keeps it in its elevated position.

In furrowing, should it be found that the gravity of the teeth G and beams H is sufficient to cause the teeth to penetrate the earth to the required depth, then the lever M may be disengaged from the teeth of the plate N, which will cause the springs to exert no elastic force on the beams; but should the farmer find the ground very hard he must bring the lever M below the lowest tooth of the plate N, which will cause the springs K to exert their greatest elastic force on the beams and cultivator-teeth vertically.

The operation of the radial teeth inserted into the cylinders in the seed-chambers is to clear away all straw and chaff and dirt that may accumulate in the channels against the lower edges of the slides E, and which would prevent the seed from passing from the hoppers into the conducting-spouts F as the planting-cylinders C revolve.

As the beam by which the machine is drawn is geared to it in the usual manner, it has not been deemed necessary to represent the tongue and gearing.

The radial pins V are made of wood and project about a half inch in the channels, and are notched in their ends to permit the ends of the horizontal sliding valves P, which are made sharp or pointed, to enter and close the openings or channels, and at the same time allow the seeding-rollers or planting-cylinders C to revolve.

I do not claim the wheels, planting-cylinders, hoppers, frame, hinged beams, cultivator-teeth, funnel-conductors, or seed-spouts, as these are made and arranged in the usual manner; but What I do claim as my invention and improvement, and desire to secure by Letters Patent, is—

1. The combination of the roller L, springs K, and lever M with the rack N, to which the cultivator-teeth G are affixed, for regulating the depth of furrowing in various kinds of hard or mellow soil without the necessity of altering the position of the transverse beams, to which the rear ends of the parallel longitudinal beams H are connected.

2. The manner of preventing the seed passing from the hopper through the channels of the planting-cylinders when the cultivator-teeth are raised from the ground, or whenever it is desired to stop the planting operation, by means of the combination of the transverse rising-and-falling bar J, cams S, bent rods R, sliding bar Q, valve-rods P, and springs T with the frame A, as described.

3. Placing the radial pins in the channels of the planting-cylinders, in the manner and for the purpose above set forth.

In testimony whereof I have hereunto signed my name, before two subscribing witnesses, this 28th day of November, 1848.

DAVID DIEHL.

Witnesses:
WM. P. ELLIOT,
BENJAMIN M. GARD.